(12) United States Patent
Cruijff

(10) Patent No.: US 12,352,373 B2
(45) Date of Patent: Jul. 8, 2025

(54) EXPANSION JOINT

(71) Applicant: TATA STEEL NEDERLAND TECHNOLOGY B.V., Velsen-Noord (NL)

(72) Inventor: Marcel Cruijff, Den Ilp (NL)

(73) Assignee: TATA STEEL NEDERLAND TECHNOLOGY B.V., Velsen-Noord (NL)

( * ) Notice: Subject to any disclaimer, the term of this patent is extended or adjusted under 35 U.S.C. 154(b) by 0 days.

(21) Appl. No.: 18/249,304

(22) PCT Filed: Oct. 16, 2021

(86) PCT No.: PCT/EP2021/078726
§ 371 (c)(1),
(2) Date: Apr. 17, 2023

(87) PCT Pub. No.: WO2022/089966
PCT Pub. Date: May 5, 2022

(65) Prior Publication Data
US 2023/0400130 A1  Dec. 14, 2023

(30) Foreign Application Priority Data

Oct. 26, 2020  (EP) .................................... 20203911

(51) Int. Cl.
*F16L 27/108* (2006.01)
*B23P 11/00* (2006.01)
*F16L 51/02* (2006.01)

(52) U.S. Cl.
CPC ........... *F16L 27/1085* (2013.01); *B23P 11/00* (2013.01); *F16L 51/026* (2013.01); *F16L 51/027* (2013.01)

(58) Field of Classification Search
CPC .......................................... F16L 27/107–1136
See application file for complete search history.

(56) References Cited

U.S. PATENT DOCUMENTS 2,738,993 A * 3/1956 Wilson .................. F16L 27/107
285/298
3,516,694 A * 6/1970 Schwartz .............. F16L 21/005
285/236

(Continued)

FOREIGN PATENT DOCUMENTS

DE          1158776 B    12/1963
DE          9205401 U1    6/1992

(Continued)

OTHER PUBLICATIONS

International Search Report mailed Jul. 1, 2022 for PCT/EP2021/078726 filed Oct. 16, 2021.

*Primary Examiner* — Jacob J Cigna
(74) *Attorney, Agent, or Firm* — Vorys, Sater, Seymour and Pease LLP; Anthony P. Venturino; Maryellen Feehery Hank

(57) ABSTRACT

An expansion joint for flexibly joining two tube segments for producing a tube for an evacuated tube transport system (ETT), wherein the expansion joint includes two annular rims and an annular flexible and airtight sleeve for rendering the expansion joint airtight wherein the sleeve includes two annular bead sections connected by an annular flexible carcass wherein each annular bead section includes a bead wire, and wherein the bead sections are designed to airtightly co-operate with rims that are fixed to the outside perimeter of each of the tube segments, wherein the rims are fixed at, or close to the opening of the tube segments.

20 Claims, 9 Drawing Sheets

(56) References Cited

U.S. PATENT DOCUMENTS

| | | | |
|---|---|---|---|
| 4,159,133 A | | 6/1979 | Belanger |
| 4,186,949 A | * | 2/1980 | Bartha ................. F16L 27/108 |
| | | | 285/229 |
| 6,945,567 B2 | * | 9/2005 | Fleck .................... F16L 51/024 |
| | | | 285/229 |
| 2017/0254456 A1 | | 9/2017 | Pearse et al. |
| 2023/0013400 A1 | * | 1/2023 | Van Waardhuizen ... F16L 25/12 |

FOREIGN PATENT DOCUMENTS

| | | | | |
|---|---|---|---|---|
| EP | 0281685 B1 | * | 12/1987 | |
| FR | 394768 A | | 2/1909 | |
| GB | 201749 A | * | 7/1922 | |
| WO | WO-2016126506 A1 | * | 8/2016 | ............. B61B 13/10 |

* cited by examiner

EXPANSION JOINT

CROSS-REFERENCE TO RELATED APPLICATIONS

This is a § 371 National Stage Application of International Application No. PCT/EP2021/078726 filed on Oct. 16, 2021, claiming the priority of European Patent Application No. 20203911.1 filed on Oct. 26, 2020.

FIELD OF THE INVENTION

This invention relates to expansion joints for an evacuated tube transport (ETT) system.

BACKGROUND OF THE INVENTION

Conventional transportation modes via water, land, rail and air result in significant adverse environmental, societal, and economic impacts. This incentivised to find alternative transportation modes that take advantage of the significant improvements in transportation technology, and efficiently move people and materials between locations. High-speed transportation systems such as high-speed trains have been contemplated as a solution to existing transportation challenges while improving safety, decreasing the environmental impact of transportation modes such as airplanes and reducing the overall time commuting between major metropolitan communities.

A high speed, high efficiency transportation system may utilize a low-pressure environment in order to reduce drag on a vehicle at high operating speeds, thus providing the dual benefit of allowing greater speed potential and lowering the energy costs associated with overcoming drag forces. In embodiments, these systems may use a near-vacuum (e.g., low-pressure) environment within a tubular structure.

A hyperloop is a proposed mode of ETT for passenger and/or freight transportation. Drawing heavily from Robert Goddard's vactrain, a hyperloop comprises a sealed vacuum tube or system of vacuum tubes through which a pod may travel with less or even free of air resistance or friction conveying people or objects at high speed and acceleration. Elon Musk's version of the concept, first publicly mentioned in 2012, incorporates reduced-pressure tubes in which pressurized capsules ride on air bearings driven by linear induction motors and air compressors. The tubes would run above ground on pylons or below ground in tunnels. The concept would allow travel which is considerably faster than current rail or air travel. An ideal hyperloop system will be more energy-efficient, quiet, and autonomous than existing modes of mass transit.

The tubes are an essential part of the ETT-system and beside requirements regarding strength and stiffness, the tubes also must be able to retain the (near-) vacuum conditions. The tube is the main component of the ETT system. The main function of the tube is to provide a lasting, evacuated path of travel for a capsule or pod. The tube is the main load bearing member to span distances between supports and resist external pressure from the atmosphere or water. Tubes are usually produced in prefabricated tube sections (also referred to as tube segments), which are joined at the construction site by joining means. In the state of the art these joining means comprise bolted flanges or welding the tube sections (tube segments) together.

A problem associated with the tubes running overground is that they are subjected to changing temperatures which cause thermal expansion. Steel tubes will result in an expansion of about 50 mm per 100 m of tube length when the temperature changes from 0° to 40° C. When there is a temperature differential between the top of the tube and the underside of the tube the tube may expand more on top, leading to a tendency to bend, potentially resulting in an uneven dimensional change of the gap between the two tube segments with the gap being wider on the bottom than on the top. The longer the rigid tube segments become, the larger the dimensional changes become. In addition, geological processes may also cause movement of the tube.

To compensate for the dimensional changes expansion joints are used at intervals along the tube as needed to allow for differing thermal expansion rates and any geological movements.

Several systems have been designed to accommodate predetermined magnitudes of thermal axial expansion within pipes in general. Two such systems include bellows-style expansion joints and slip-style expansion joints. Bellows-style expansion joints are incorporated into the piping system, such that ruffles are included in segments of the pipe itself. Deflection of the ruffled sections absorbs vertical and horizontal forces, allowing the rigid segments of the pipe to maintain their position. Ruffled sections incorporated into the pipe, however, create design challenges and lead to high manufacturing costs. Additionally, the frequent deflection of bellows-style expansion joints increases the incidence of joint failure resulting from, for example, in-plane squirm, column-squirm, fatigue, creep fatigue, burst, collapse, overstretching, corrosion, etc. Bellows-style expansion joints also lack the ability to resist bending moments, as they lack lateral and/or angular rigidity within the joint. Steel bellow style expansion joints cannot cope with torsional forces.

Slip joints, as for instance disclosed in US2017/0254456-A1 address some, but not all, of these shortcomings of bellows-style expansion joints. Slip joints operate as follows: at a connection point of piping, there is an outer tube connected to one side and inner tube connected to the other side. The inner tube, or slip tube, can slide in and out of the outer tube, which allows the slip joint to absorb the linear expansion of the pipe. Slip joints may typically be heavier than a bellows-style expansion joint, but may also be cheaper to manufacture, may afford longer longitudinal expansions and/or contractions and may be significantly more robust. However, their construction is relatively complicated and lining out the joints during construction and use is not without challenges.

The problem associated with these state-of-the-art solutions for connecting tube segments into a tube is that they are expensive, require high precision in outlining, are time consuming to provide onto the tube segments (bolted flanges) and require additional seals to provide an airtight connection, or when a tube segment becomes damages the tube segment is difficult to replace (welded tubes). Also, the state-of-the-art solutions for expansion joints are intricate, expensive and difficult to maintain, and not easy to replace.

FR394768A discloses a flexible coupling device for assembling tubes, and is especially intended to be applied to the extraction tubes of beer machines wherein the pressure inside the tubes is at about equal ($P_{in} \approx P_{out}$) to or slightly higher ($P_{in} \geq P_{out}$) than the atmospheric pressure to enable the transport of the liquid through the tubes. The coupling device consists of sleeve of rubber or other similar substance, wherein at each end an interrupted metal ring B made of steel or another suitable metal is embedded. Because these rings are not closed hoops but interrupted rings, they can be opened in a spring-like fashion to give way during the introduction of the flanged ends of the tubes or pipes C in the coupling device, then the spring-like forces the rubber sleeve to grip strongly the outside of the tubes or pipes. Since the diameter of the tubes for an ETT segment, is in the order of several meters, somewhere between 2 m and 5 m, the flexible coupling according to FR394768A are unsuited for application in such a system because the interrupted rings would have to be unpractically thick, large and unwieldy to keep sufficient force on the sleeve to keep it airtight.

Objectives of the Invention

It is an object of the invention to provide an expansion joint which has a simple construction, is easy to produce and allows easy assembly.

It is also an object of the invention to provide an expansion joint which can deal with deviations in outlining of tube segments of the ETT-system and any dimensional changes caused by temperature differences or geological movement.

It is also an object of the invention to provide an expansion joint which does not require additional seals to provide an airtight connection between connected tube segments.

It is also an object of the invention to provide an expansion joint which can be replaced easily and quickly if it becomes damaged and requires little to no maintenance after installation.

DESCRIPTION OF THE INVENTION

One or more of the objects is reached with an expansion joint for flexibly joining two tube segments for producing a tube for an evacuated tube transport system (ETT), wherein the expansion joint comprises two annular rims and an annular flexible and airtight sleeve for rendering the expansion joint airtight wherein the sleeve comprising two annular bead sections connected by an annular flexible carcass wherein each annular bead section comprises a bead wire, and wherein the bead sections are designed to airtightly co-operate with the rims that are fixed to the outside perimeter of each of the tube segments preferably at or close to the opening of the tube segments.

The bead wire is a continuous and uninterrupted annular member, i.e. a closed hoop or coil, such as the bead wire in a tyre (cf. Fundamentals of modern manufacturing, $4^{th}$ edition, M. P. Groover (2010), page 322).

Preferred embodiments of the expansion joint are provided in dependent claims 2 to 7.

The tube segments, which may be prefabricated tube segments off-site or fabricated on site, are the building blocks of the tube for the ETT-system, and for the purpose of this invention a tube segment (also referred to as tube section) is the length of tube of the ETT-tube between two consecutive expansion joints. From a productivity point of view the tube segments ideally have a standard length, but this is not necessary. If practical circumstances in the field require a different length, then consecutive tube segment may have a different length. By means of example, if the tube segments are 100 m long and if these tubes segments are produced from steel, this results in a linear expansion of about 50 mm per 100 m of tube length when the temperature changes from 0° to 40° C. The consecutive tube segments to be connected with the expansion joint according to the invention must therefore leave a gap which is sufficiently large for the contraction, expansion and bending to be absorbed, and leave enough space for the flexible carcass of the expansion joint.

In a preferred embodiment the rim bead or beads of the expansion joint are provided with a hump (also referred to as rim bead hump or bead hump) to prevent the bead sections of the sleeve to slip off the rim when mounted in the unpressurised condition. This is achieved by providing a hump on the rim, such that the circumference at height h1 of the hump is larger than the circumference at height h3 of the rim bead (h1>h3). h1, h2 and h3 are measured with respect to the outer surface of the tube segment at the location of the rim (as depicted in FIG. 8). The height h2 must be determined such that when the pressure differential $P_{out}-P_{in}$ is maximal (i.e. about 1 bar), that the force exerted on the bead section by the inward pull of the flexible carcass never exceeds the force needed to pull the bead section over the rim top, which would break the airtight seal and lead to failure of the expansion joint. The height h2 is a function of parameters such as the elasticity and strength of the wire cord, the elasticity and strength of the bead section as a whole, the friction between the sleeve and the rim and the pressure differential (which in principle never surpasses about 1 bar). However, h2 may also not be too high, as otherwise installation of the sleeve around the rim will become too difficult. If there is no rim bead hump, then h1=h3. For the sake of completeness, the rim profile may also be provided with a negative hump (i.e. h1<h3), but this is not a preferred option because the bead sections may more easily slide out of the rim bead in the unpressurised situation.

The rims of the expansion joint on the adjoining tube segments are preferably mounted mirrored with respect to each other as depicted in the FIGS. 5-7.

The rims are not necessarily identical in dimensions, as there may be practical reasons for choosing e.g. a different rim on either side, for instance if the outer diameter of the tube segments differ.

In an embodiment the rim is provided with a rim profile which has a thick and rounded L-shape comprising a rim top (16) on the top of the upstanding leg of the L, a rim bead (17) for receiving the bead section of the sleeve in the corner of the L and optionally a rim bead hump (18) at the end of the horizontal leg of the L. The height of the rim bead hump as measured from the bottom surface of the L, which is the surface that will be connected to the tube segment, is defined as h1. The lowest height of the rim bead is defined as h3. The height difference between the rim bead and the rim top is defined as h2. The legs of the L do not need to be equally thick.

In an embodiment the flexible carcass comprises rubber, preferably a synthetic rubber such as butyl rubber or a mixture of rubber composites. This material is airtight and has the required flexibility. However, any flexible and airtight material could, in principle, be used.

In an embodiment both the flexible carcass and the bead sections comprises rubber, preferably a synthetic rubber such as butyl rubber or a mixture of rubber composites. In this embodiment the bead sections and the carcass are similar or the same materials. This is more practical from a production point of view.

In an embodiment the flexible carcass is reinforced with fibres or cords, such as steel cords, polyester cords or aramid cords. The tension in the carcass can be quite high, and in order to reduce the "sucking-in-depth" when the expansion joint is in use, the carcass may be strengthened with fibres or cords. The strengthening also prevents the carcass to be pierced or damaged easily.

The bead wire in the bead section is an annular member or hoop and has the function of locating and anchoring the bead section into the rim bead. It should be noted that the bead wires in the bead sections of the sleeves have a high Youngs' modulus, so these must be considered for the purpose of installing the sleeve as being practically inelastic.

In a preferable embodiment the bead wire in the bead section is a steel wire. Steel wire is very strong, dependable, relatively cheap, recyclable, elastic to some extent, and is readily available in a variety of thickness and strength. Alternatives to steel wire as bead wire are cords produced from aromatic polyamide fibres such as aramid fibres.

The outer surface of the expansion joint may be provided with an UV-protective coating. UV light in sunlight may cause a degeneration of the material of the expansion joint, which may lead to an early failure or a shorter lifetime of the expansion joint. The UV-protective coating shields the expansion joint form the UV-light and ensures a longer life span and a reliable performance.

According to a second aspect the invention is also embodied in a method for producing, or in a method of producing, a tube for a evacuated tube transport system (ETT) comprising expansion joints according to the invention and prefabricated tube segments, wherein the tube segments are provided with the rims on the outside perimeter of the tube segments preferably at, or close to the opening of the tube segment, and wherein the rims are designed to cooperate with the bead sections of the expansion joint, the method comprising the steps of:
  positioning two tube segments with the open ends of the segments facing each other with a gap between the tube segments;
  optionally applying a bead lubricant and/or a sealant on the rims of the opposing tube segments;
  sliding the bead sections of the sleeve over the rim top into the rim beads of the rims provided on the tube segments, and allow the bead sections to be seated in the rim, thereby flexibly connecting the tube segments;
  lower the internal pressure in the tube (to the operating pressure of an ETT-system,) thereby sucking the flexible carcass of the expansion joint inwardly between the gap between two adjoining tube segments and allow the bead sections to become firmly seated in the respective rims provided on the tube segments and thereby providing an airtight seal.

The lowering of the internal pressure in the tube may be sufficient to persuade the sleeve to "pop" in place and form an airtight seal. If not, some assistance may have to be provided to seat the bead section in the rim bead snugly, either by applying a sealant or by mechanical means. The operating of an ETT system is less than 0.1 bar, preferably less than 0.01 bar (10 mbar), even more preferably less than 5 mbar, even less than 2 mbar or even about 1 mbar ($\approx$100 Pa).

Preferably the rims are provided with a hump as described herein above. This will prevent the bead sections to slide off the rims in the unpressurised condition.

In the presence of these humps sliding the bead sections of the sleeve into the rims will require sliding the bead sections over the hump(s) and into the rim beads of the rims provided on the tube segments, and allow the bead sections to be seated in the rim, thereby flexibly connecting the tube segments.

Sliding the rim beads of the sleeve over the rim top may require some force, similar to when mounting a tire of a car or a bicycle onto the rim of a wheel, particularly sliding the last part of the bead section over the rim top may require some persuasion. A possible sequence of installing the sleeve is proposed in FIG. 9. After sliding the rim beads over the rim top, the bead sections are seated in the rim bead. Before lowering the internal pressure, the bead sections are not fixedly seated in the rim bead, and some movement is still possible, again like an uninflated tire that is mounted on the rim of a wheel. If the rim profile is provided with a rim bead hump, then the bead section cannot easily leave the rim bead if the height of the rim bead ($h3$) is smaller than the height ($h1$) of the rim bead hump. The same is the case when the sleeve is punctured or when the pressure inside the tube segment is equalised with the outside pressure. To remove the sleeve the sequence as described in FIG. 9 may be followed in reverse.

In this method the two tube segments are positioned opposite each other with a gap between the open ends of the tube segments. The rims may be provided with a bead lubricant to facilitate sliding the bead over the rim, and the rims may also be provided with a sealant to provide additional sealing capability to the bead section-rim combination. After sliding the bead sections over the rims of the opposing tube segments the expansion joint is not yet airtight, can still be moved, for instance to correct an inadvertent rotation of the one bead section vis-à-vis the other bead section of the expansion joint which, when left uncorrected, could lead to additional and undesired tension in the expansion joint when in use. After sliding the bead sections over the rims of the opposing tube segments the state of the expansion joint is comparable to the state of an uninflated bicycle tire. The tire can also still be moved, even when both bead sections of the bicycle tire are contained by the rim sections of the wheel below the rim top as seen in FIG. 5. Only when inflating the tire, the bead sections become seated in the rim sections thus ensuring that the rim sections are tightly pushed into the rim and provide an airtight seal. Even though the bead sections could be slid over the rims of the wheel with relative ease, the increased pressure in the tire ensures that the bead section cannot leave the confinement of the rim. The expansion joints according to the invention work in a comparable way, but the other way around. In the method according to the invention the tube is depressurised. "In use" in the context of this invention implies a pressure difference between the outside and the inside of the tube, where the atmospheric pressure on the outside is (much) higher than the pressure in the tube section (tube segment). In the context of this invention this means that the evacuated tube transport system tube comprising a plurality of tube segments and expansion joints according to the invention, is subjected to atmospheric pressure outside the tube wherein the pressure inside the tube or tube section (tube segment) is less than 0.1 bar, preferably less than 0.01 bar (10 mbar), even more preferably less than 5 mbar, even less than 2 mbar or even about 1 mbar ($\approx$100 Pa).

By de-pressurising the tube the flexible carcass is sucked inwardly into the gap between the tube segments. The higher the pressure differential, the larger the inward displacement of the carcass. As a result of the pressure differential a tension build up in the carcass and this tension ensures that the bead sections become seated in the rims and, with the optional aid of a sealant provided between the bead section and the rim, provide an airtight and stable seal. The flexible carcass absorbs the contraction, expansion and bending of the adjacent tube segments.

A major advantage of the expansion joint and the method of the invention is that the alignment of the adjacent tube sections (tube segments) is less critical than with, e.g. of bellows-style expansion joints or slip joints. The flexible character of the material of the expansion joint according to the invention allow to compensate for any differences in alignment of the adjacent tube segments. Also, the expansion joint allows for a flexible mounting of the tube segments as well. According to one embodiment of the invention, one end of the tube segment is mounted fixedly onto a support structure, such as a pylon or a foundation, whereas the other end of the tube segment is mounted dynamically onto a support structure. The fixed mounting does not allow any movement in any direction, whereas the dynamic mounting allows a limited amount of movement in the longitudinal direction, i.e. in the direction of the adjacent tube segment, thereby increasing or decreasing the gap between the two tube segments to compensate for the expansion or contraction, and for any geological movement. It is to be understood that when one end of a tube segment is fixedly mounted, that it is preferable that the other side is dynamically mounted.

Although the expansion joint according to the invention is able to span a considerable gap between consecutive tube segments, it is preferable for dimensional stability to limit the gap between consecutive tube segments to between 25 and 200 mm, preferably between 30 and 150 mm, more preferably between 35 and 100 mm, even more preferably between 40 and 75 mm.

Another significant advantage of the expansion joint according to the invention is that it can be easily removed when the pressure differential is zero. So, in case the expansion joint is damaged, it can be easily replaced. Also, if the tube segment becomes damaged, the expansion joints can be quickly removed to allow a quick replacement or repair of the tube segment. Also, the production of the expansion joints is also less expensive than the production of the mechanically more complicated bellows-style expansion joints, which usually require expensive flanges to be mounted onto the tube segments and moreover require precise alignment when mounting the bellows-style expansion joints, and also less expensive than the even more complicated slip joints.

According to a third aspect the invention is also embodied in the use of the expansion joint according to the invention in the production of a tube section (tube segment) for or of an evacuated tube transport system (ETT) using tube segments wherein the tube segments are provided on the outside perimeter with rims designed airtightly co-operate with the bead sections of the expansion joints, wherein the rims are preferably provided at, or close to the opening of the tube segment.

In an embodiment, when the internal pressure in the tube section (tube segment) is at the operating pressure of an ETT-system, the flexible carcass is sucked inwardly between two adjoining tube segments due to the pressure difference between outside the tube and inside the tube, and wherein the carcass is loaded in tension as a result of said pressure difference, and wherein the bead sections become seated in the rims provided on the outside perimeter of the tube segments due to said tension.

In an embodiment the rims on the outside perimeter of the open ends of the tube segments are provided by means of welding a metal ring, preferably a steel ring, to the outer perimeter, and wherein the ring is provided with a rim profile.

In an embodiment the rim consists of a solid metal ring provided with a rim profile, or wherein the ring is a metal strip which is formed, e.g. by roll-forming, into a rim profile.

In an embodiment one end of each tube segment is fixedly connected to a support structure, e.g. a pylon or a foundation, and wherein the other end of the tube segment is movably connected to a support structure to allow the tube segment to expand, contract and bend, and wherein the flexible carcass of the expansion joint between two subsequent tube segments absorbs the dimensional changes of the contracting, expanding or bending tube segment.

In an embodiment a sealant is provided between the rim profile of the tube segment and the bead section of the expansion joint to further improve the airtightness, and/or wherein a bead lubricant is provided between the rim profile of the tube segment and the bead section of the expansion joint to facilitate the sliding of the bead section over the corresponding rim on the tube segment.

BRIEF DESCRIPTION OF THE DRAWINGS

The invention will now be explained by means of the following, non-limiting figures.

As seen in FIG. 5, each annular bead section 11 is seated in the corner of the L-shape of the respective annular rim to be contained entirely below the height h1 of the rim top 16 of the annular rim 15 and contact the lowest point of the rim bead (labelled h3 in FIG. 8). The annular flexible carcass 13 of the sleeve 14 extends from the first annular bead section 11 then over the rim top 16 of the first annular rim 11 and then across the gap, then over the rim top 16 of the second annular rim 11, and then to the second annular bead section 11.

As seen in FIG. 5 and FIG. 8, each upstanding leg has an inner wall proximal to the gap and an outer wall distal to the gap and a curved portion, comprising the rim top 16, extending from the inner wall to the outer wall to define a U-shape. As seen in FIG. 5, the inner wall of the upstanding leg of the first annular rim 15 of the expansion joint is opposed to face the inner wall of the upstanding leg of the second annular rim 15 of the expansion joint.

The flexible carcass 13 connects the two bead sections. The rims, in this example, consist of a weldable and roll-formed annular profile that is welded to the end of the tube segments. The welds are indicated with w. The rim may also be a solid material, but this makes the rim heavier, more expensive, and more difficult to handle. FIG. 8 shows that if there is a rim bead hump 18 the circumference of the rim bead 17 (h3) is smaller than the circumference of the highest point of the rim bead hump (h1, in short: the hump) around the tube segment over which the bead section must be slid. The height h2 must be determined such that when the pressure differential $P_{out}-P_{in}$ IS maximal (i.e. about 1 bar), that the force exerted on the bead section by the inward pull of the flexible carcass never exceeds the force needed to pull the bead section over the rim, which would break the airtight seal and lead to failure of the expansion joint. The height h2 is a function of parameters such as the elasticity and strength of the wire cord, the elasticity and strength of the bead section as a whole, the friction between the sleeve and the rim and the pressure differential (which never surpasses about 1 bar). The height h2 is a compromise between the ease of mounting the sleeve over the rim top and the prevention of sucking the bead section over the rim top when the expansion joint is in use.

FIG. 8 shows a cross section of the rim and an indication of the different relevant heights h1 to h4 in the presence of rim bead hump 18. The rim top 16, rim bead 17 and rim bead hump 18 are indicated, and the shape of the rim profile has a thick and rounded L-shape comprising a rim top (16) on the top of the upstanding leg of the L, a rim bead (17) for receiving the bead section of the sleeve in the corner of the L and optionally a rim bead hump (18) at the end of the horizontal leg of the L. The height of the rim bead hump as measured from the bottom surface of the L, which is the surface that will be connected to the tube segment, is defined as h1. The lowest point of the rim bead is defined as h3. The height difference between the rim bead and the rim top is defined as h2. The rim profile must have a minimal height h3 to allow the installation of the sleeve on the rim. If h3 is too low, then there is insufficient slack in the bead section to mount the sleeve onto the rims (see FIG. 9 and the accompanying description). If h3 is too high, then it will be very difficult to slide the bead section into the rim bead during installation of the sleeve. It is noted that in the absence of a rim bead hump h3=h1, and h4−h1=h2.

FIG. 9a shows that the sleeve is inserted in the gap between the two adjoining tube segments, each provided with an annular rim with a rim profile such as the one depicted in FIG. 8. FIG. 9b shows the first step which is to position the top right bead section on the tube segment against the rim. The length of the bead wire is such that this will (just) allow to lift the bead section on the opposite side (bottom right) over the rim top and seat the bead section in the rim bead as indicated by the arrow. This step shows the importance of the correct height of h3. If h3 is too low, then the bead section cannot be slid over the rim top on the opposite side. If h3 is too high, then the seating of the bead section in the rim bead will become very difficult. The left-hand side of the sleeve can be lifted over the rim and positioned on the tube segment against the rim as indicated by the arrow. FIG. 9c shows that the length of the bead wire is such that this will (just) allow to lift the bead section on the opposite side (top left) over the rim and seat the bead section in the left-hand rim bead as indicated by the arrow. The bead section on the right-hand side can now be seated in the rim bead, which results in the right-hand bead section to be seated in the rim bead along the entire circumference of the rim. In the presence of a rim bead hump, the last portion of the bead section may need some persuasion to be slid over the hump. FIG. 9d completes the installation by sliding the left-hand bead section in the rim bead, thereby seating the left-hand bead section in the rim bead along the entire circumference of the rim. In the presence of a rim bead hump, the last portion of the bead section may need some persuasion to be slid over the hump. FIG. 9e shows the result. It should be noted that these figures show a 2-D representation, but that the sleeve and the rim are annular in shape, just like a bicycle wheel rim and a bicycle tire. The dashed lines connecting the left-hand bead sections and the right-hand bead sections illustrate the 3-D character of the sleeve.

In FIGS. 9a-9e the pressure inside the tube equals the outside pressure. FIG. 9f shows the expansion joint in its full glory, and in use, where the flexible carcass is sucked inwardly by the pressure differential ($P_{in}\ll P_{out}$), providing an airtight seal and a flexibility to expand, contract, bend and rotate.

Figure 1:
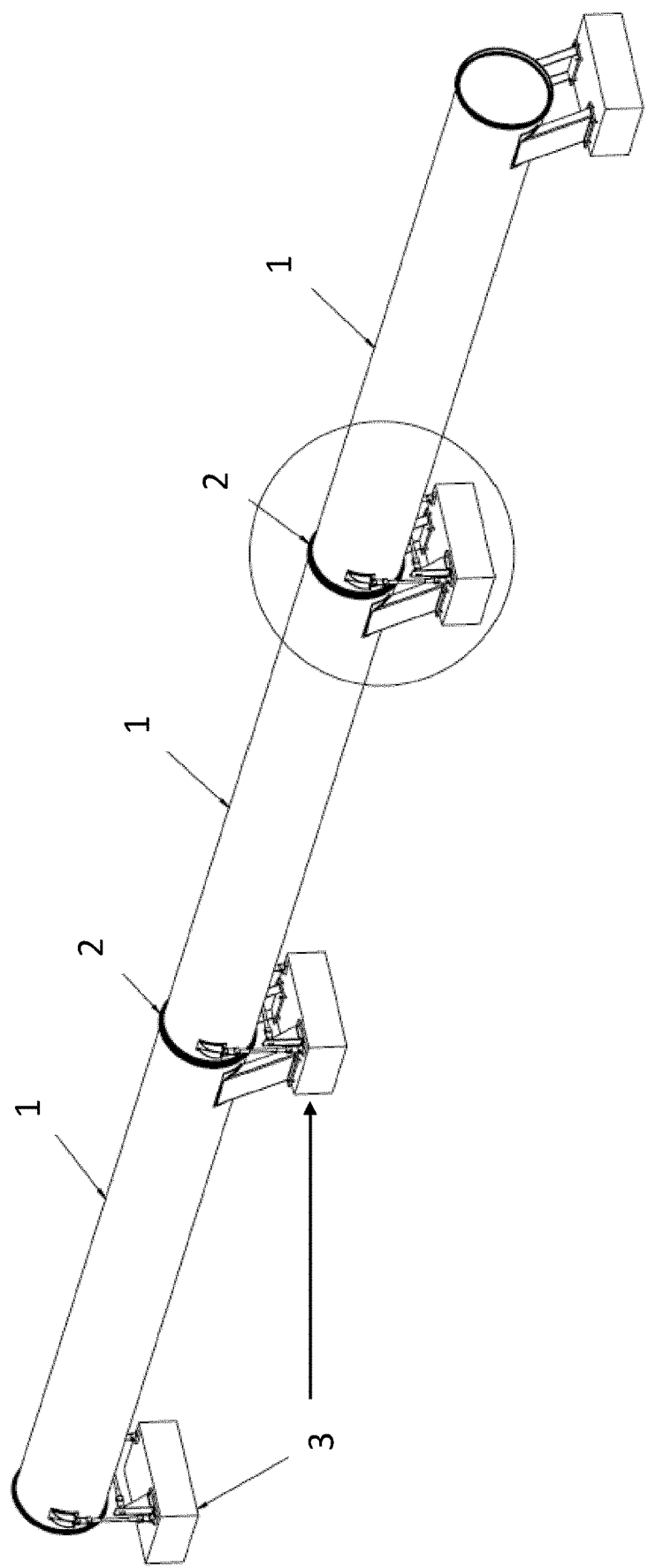
FIG. 1 shows a schematic drawing of an ETT-tube consisting of three tube segments 1 and two expansion joints 2. The ETT-tube is mounted on foundations 3.
Figure 2:
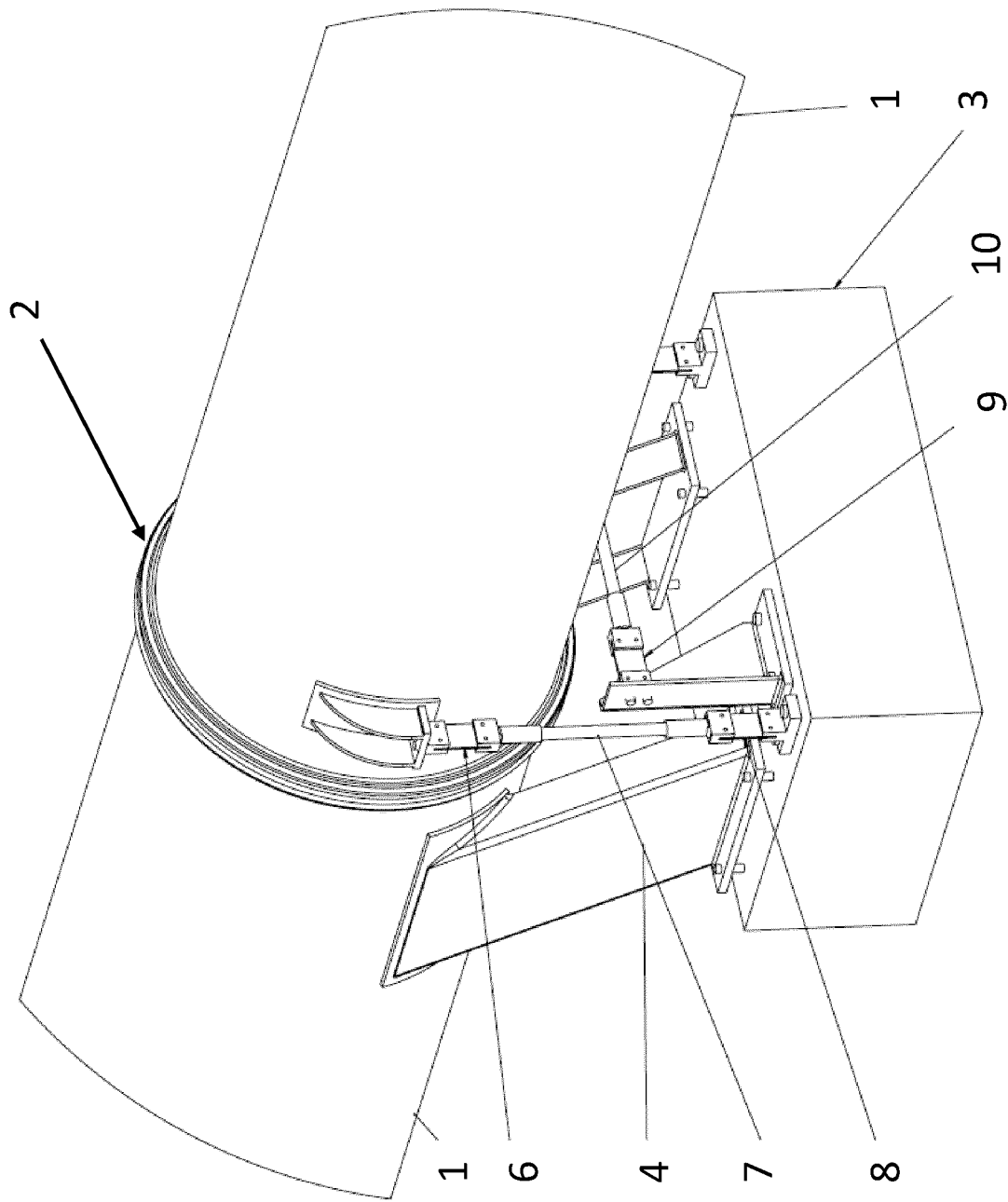
FIG. 2 shows an enlarged section of the part in the circle of FIG. 1. The two adjoining ends of the consecutive tube segments 1 are shown as well as the expansion joint 2 in between the two adjoining tube segments. The foundation 3 is the support on which the mounting 4 to fixedly mount the left-hand tube segment to the foundation 3 is positioned, as well as the flexible mounts to dynamically mount the right-hand tube segment. The flexible mounts are, in this non-limiting embodiment, formed by a pair of supports 7 for vertical alignment, one on either side of the tube segment (the foot of the other one is just visible below the tube segment), and a support 10 for horizontal alignment. The spring blades 6 and 8 in the vertical supports, and 9 in the horizontal support eliminate vibrations (e.g. when a pod passes in the tube) and allow for slow movement due to expansion, contraction and geological movement. Support 7 consist out of a rod with at one end right-handed thread and at the other end left-handed thread. By turning support 7 the height can be adjusted.
Figure 3:
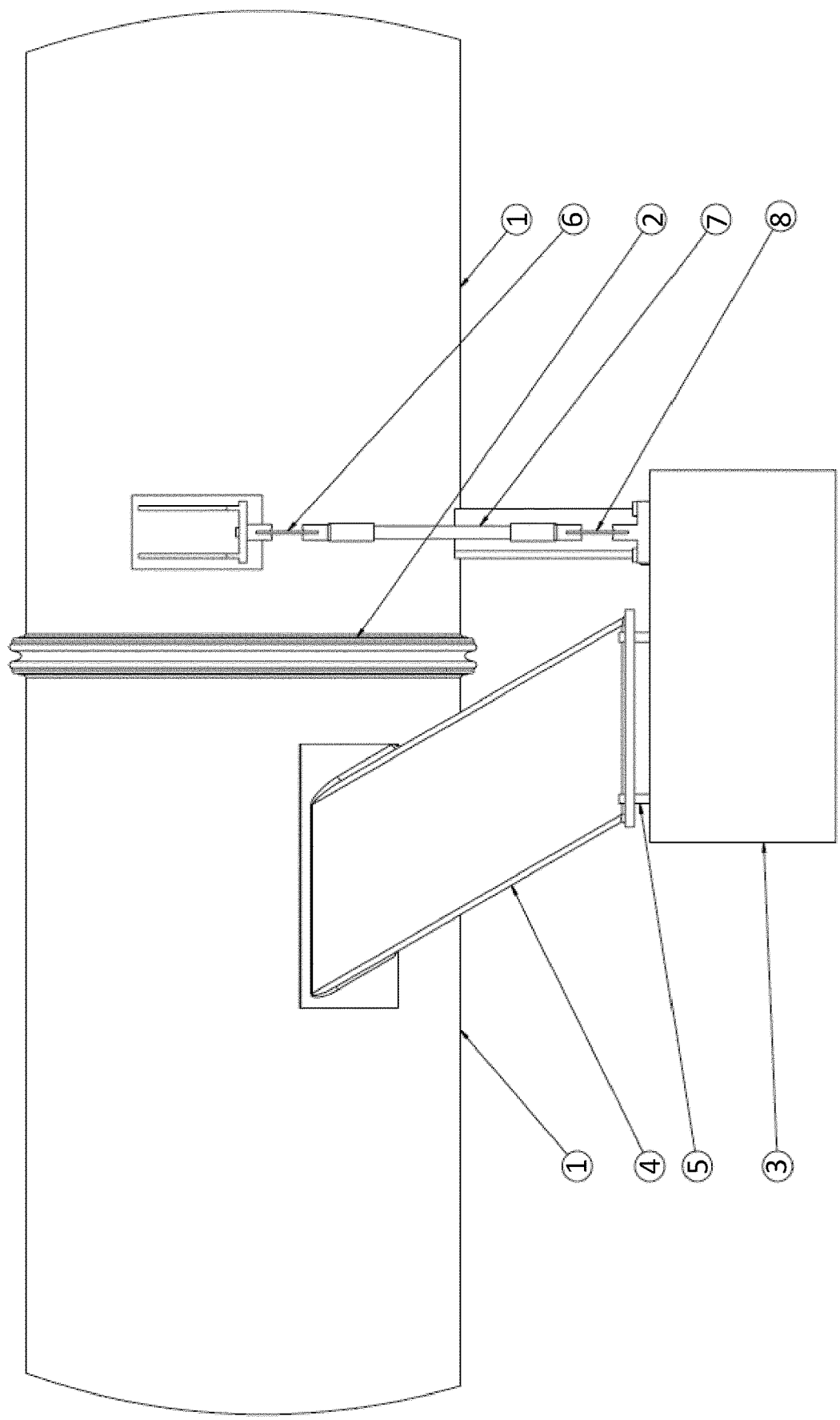
FIG. 3 shows a side view and FIG. 4 an orthogonal view, which clearly shows the horizontal support 10 and the two vertical supports 7.
Figure 4:
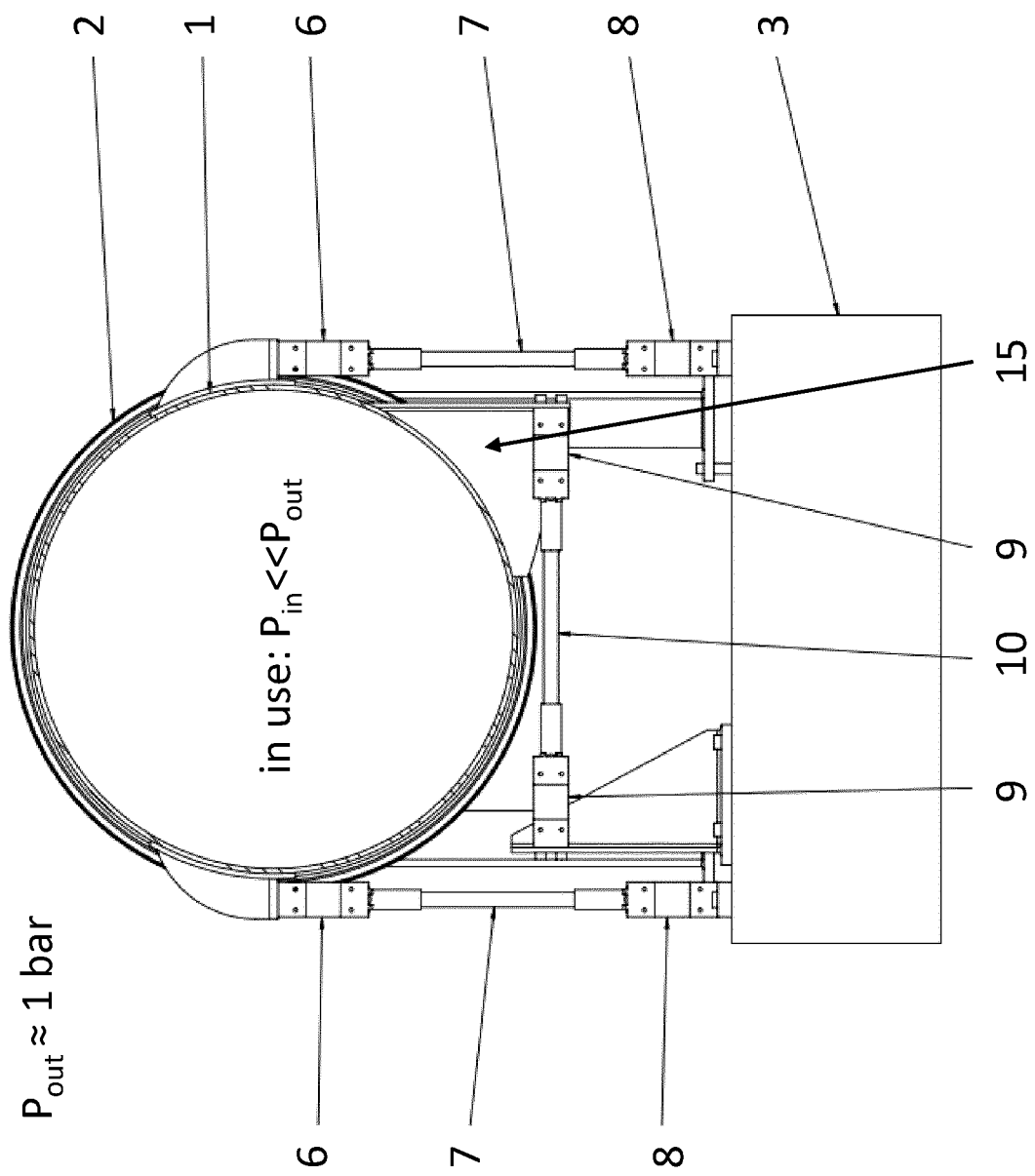
FIG. 4 also shows that the pressure in the tube ($P_{in}$) is much smaller in use than the pressure outside the tube ($P_{out}$), the latter being atmospheric pressure, and the former being the operating pressure of the ETT-system. It will be clear that during construction, when the inside is still open to the atmospheric conditions, that the pressure in the tube segment equals the outside pressure.
Figure 5:
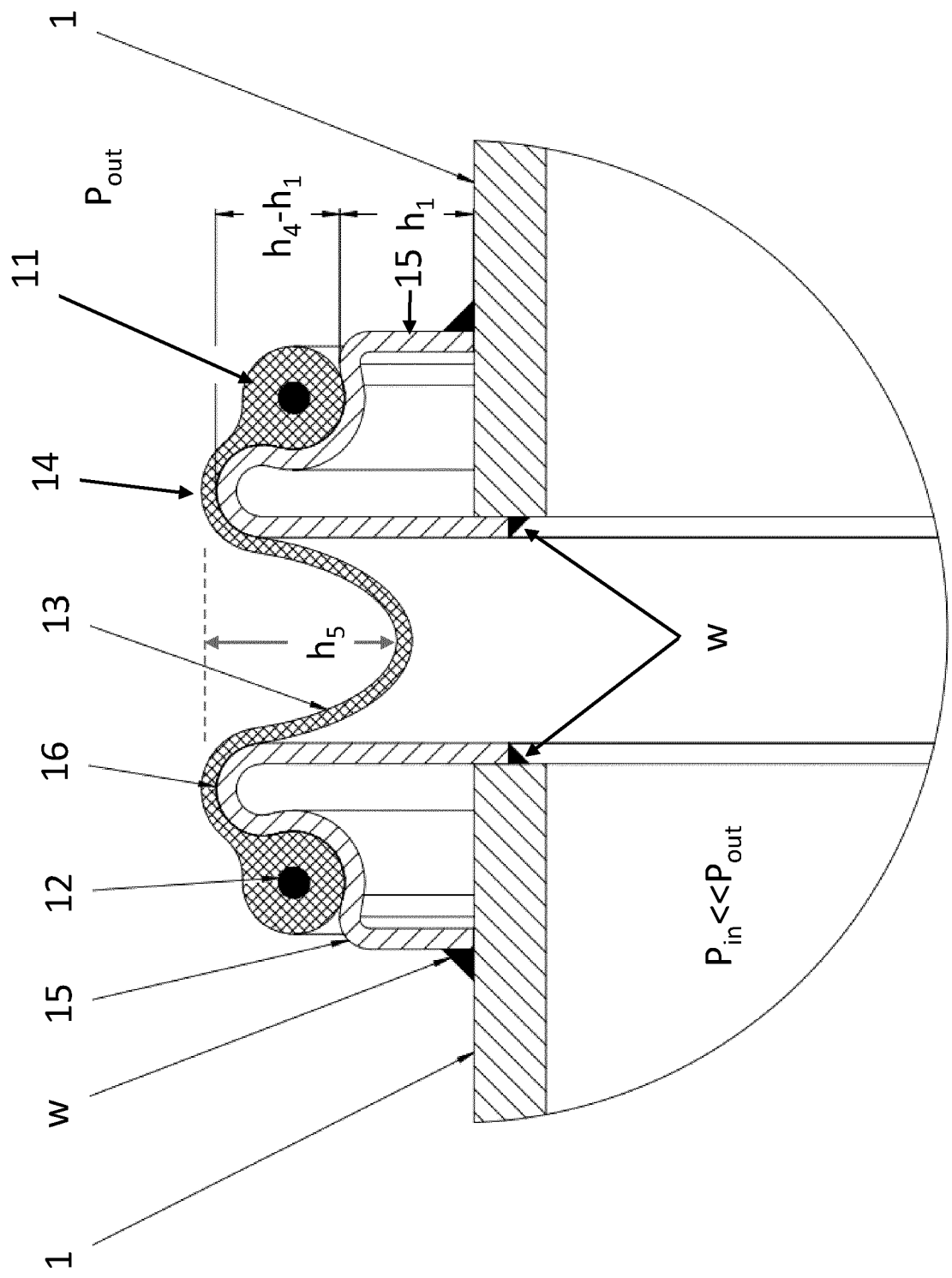
FIG. 5 shows a cross section of the annular expansion joint 2 according to the invention and the two ends of the tube segments 1, each provided with a rim 15. The expansion joint comprises two bead sections 11, with a bead wire 12 in each bead section. The bead wire in the bead section is an annular member or hoop and has the function of locating and anchoring the bead section into the rim bead. The bead wire is a continuous and uninterrupted annular member, i.e. a closed hoop or coil, such as the bead wire in a tyre.
Figure 6:
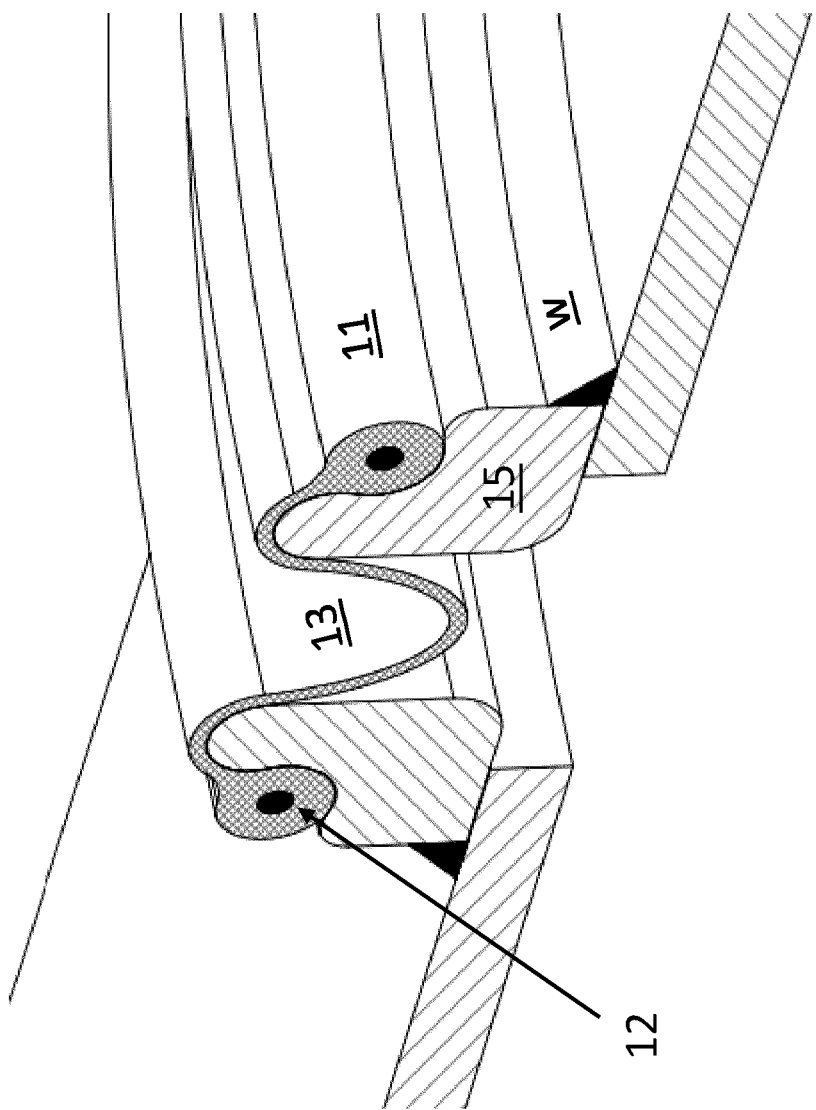
FIG. 6 shows a schematic view of the expansion joint mounted on a solid rim 15, and it also shows the curvature of the expansion joint as it surrounds the tube segments.
Figure 7:
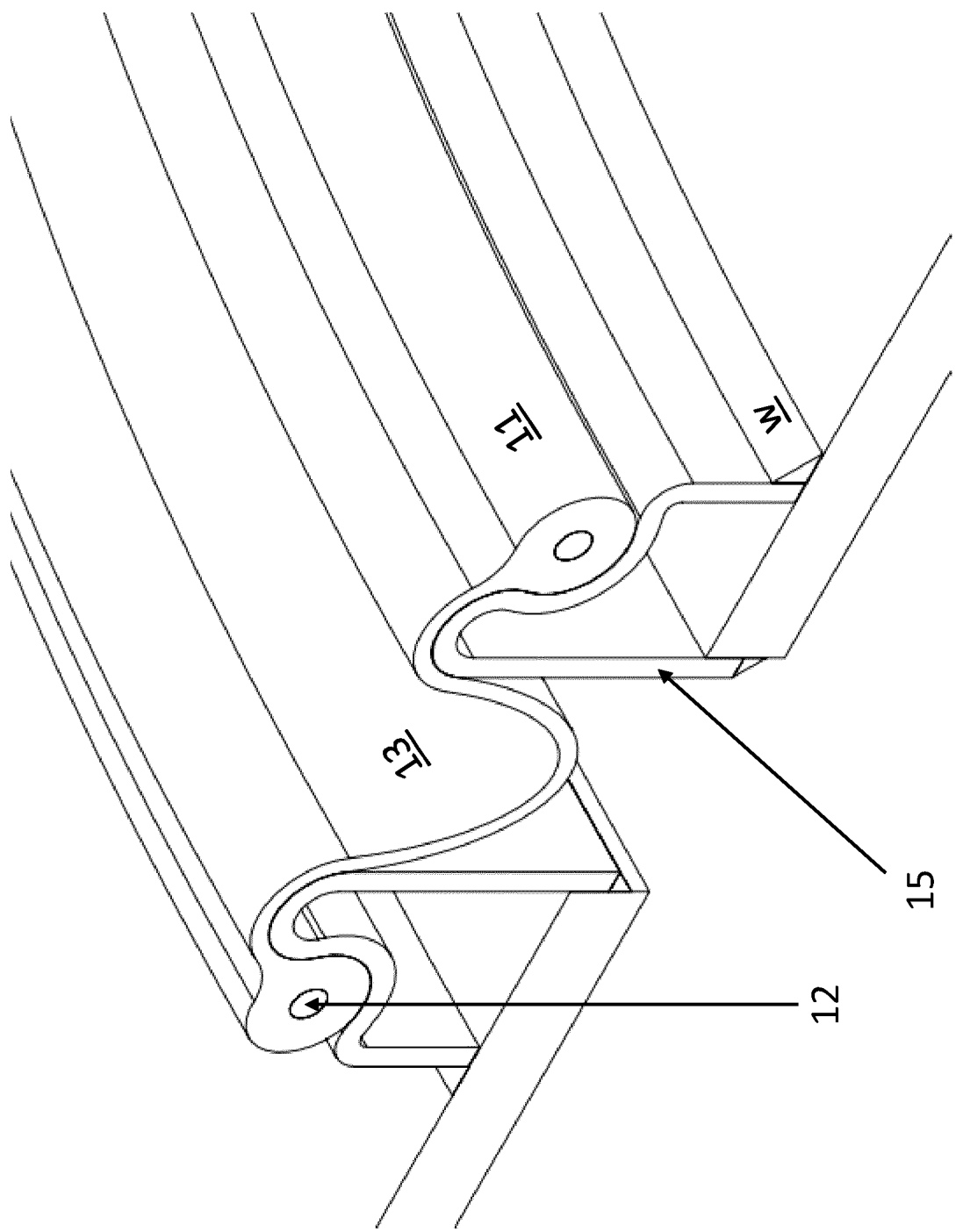
FIG. 7 shows a similar view, but with the hollow rim 15 of FIG. 5.
Figure 8:
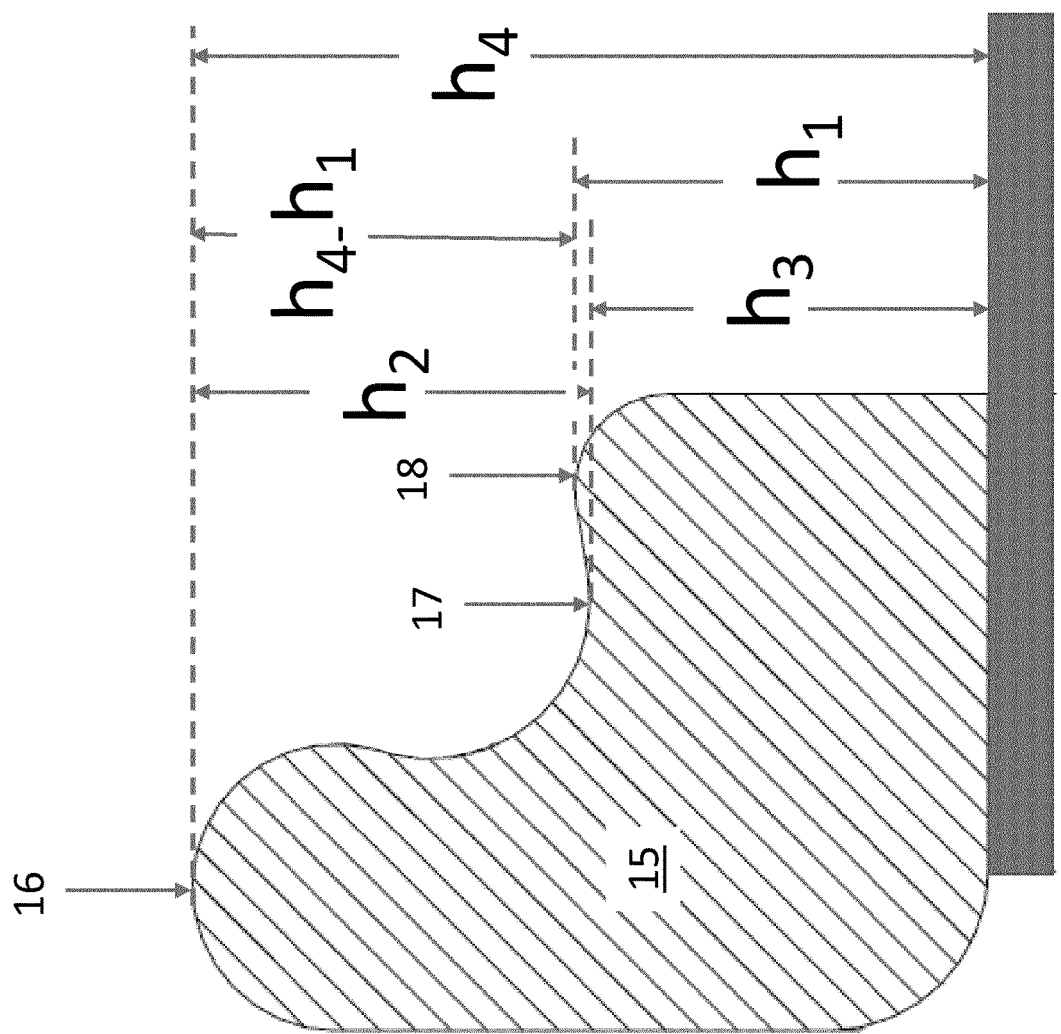
Figure 9:
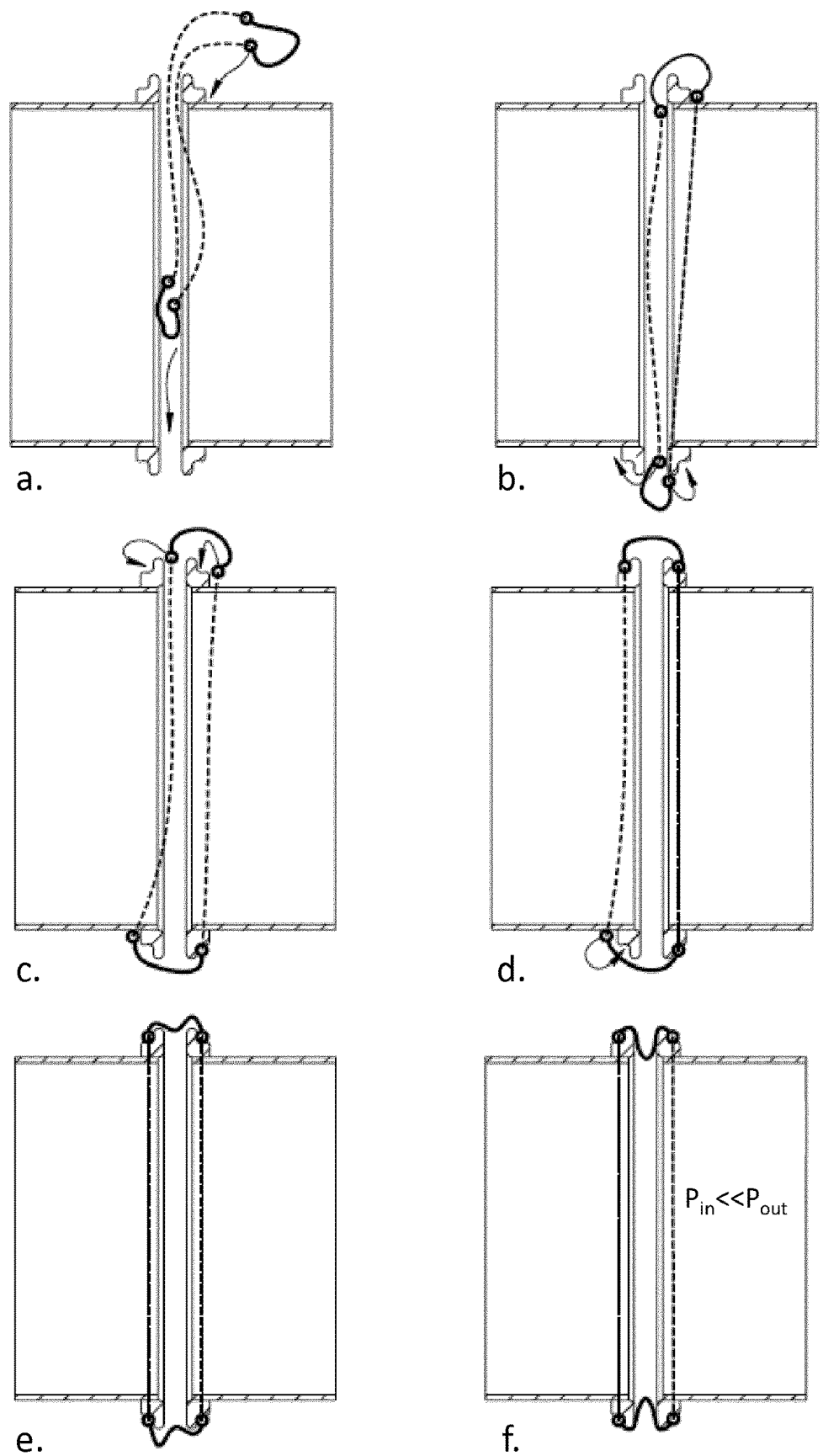
FIG. 9 shows a sequence of 6 steps by means of which the sleeve can be installed on the rims. It should be noted that the bead wires in the bead sections of the sleeves have a high Youngs' modulus, so these must be considered for the purpose of installing the sleeve as being practically inelastic. The bead wires are also continuous and uninterrupted and the wires cannot be opened during installation of the sleeve and closed afterwards. By using the sequence in FIG. 9 it is possible to install sleeve despite the inelasticity of the bead wires and despite the fact that the bead wires are continuous and uninterrupted.

It should be noted that this sequence is a non-limiting example, and there may be other sequences to achieve the result of FIG. 9f.

The invention claimed is:

1. A method for producing a tube for an evacuated tube transport system (ETT) comprising expansion joints and prefabricated tube segments,
   wherein the expansion joint comprises two annular rims to provide opposed first and second annular rims, each said annular rim provided on an outside perimeter of a respective said prefabricated tube segment, and an annular flexible and airtight sleeve for rendering the expansion joint airtight,
   wherein the sleeve comprises two annular bead sections, to provide first and second annular bead sections, connected by an annular flexible carcass, wherein each annular bead section comprises a bead wire, and wherein the bead sections are designed to airtightly co-operate with the two annular rims provided on the outside perimeter of the prefabricated tube segments,
   wherein the prefabricated tube segments are provided with the two annular rims which are each provided with a rim profile on the outside perimeter of each of the prefabricated tube segments, and wherein the rim profile is designed to cooperate with the two annular bead sections of the sleeve, wherein each annular rim is provided with the rim profile having a L-shape extending from a surface of the prefabricated tube segment and comprises a horizontal leg and an upstanding leg, wherein there is a rim top on top of the upstanding leg, a rim bead for receiving the bead section of the sleeve in a corner of the L-shape, and optionally a rim bead hump at an end of the horizontal leg of the L shape, wherein the upstanding leg of the first annular rim of the expansion joint is opposed to face the upstanding leg of the second annular rim of the expansion joint, whereby the rims of the expansion joint on the adjoining tube segments are mounted mirrored with respect to each other;

wherein each upstanding leg has an inner wall proximal to the gap and an outer wall distal to the gap and a curved portion, comprising the rim top, extending from the inner wall to the outer wall to define a U-shape, wherein the outer wall provides a convex wall and a concave wall, the curved portion extending to the convex wall, the convex wall extending to the concave wall, and the concave wall extending to the horizontal leg;

the method comprising the steps of:

positioning two prefabricated tube segments to be adjoining with open ends of the prefabricated tube segments facing each other with a gap between the prefabricated tube segments;

wherein each annular rim has a first end proximal to the gap and a second end distal to the gap, wherein each rim bead section is between the first end and the second end of each annular rim, wherein the first end proximal to the gap comprises the upstanding leg of the L shape, wherein the second end proximal to the gap comprises the end of the horizontal leg of the L shape;

wherein the rim bead tops of the two annular rims are opposed and each have a circumference greater than an outer circumference of the prefabricated tube segment;

wherein the rim second end distal to the gap has a circumference greater than the outer circumference of the prefabricated tube segment;

optionally applying a bead lubricant and/or a sealant on the rims of the adjoining prefabricated tube segments;

sliding the bead sections of the sleeve over the annular rims of the prefabricated tube segments, thereby flexibly connecting the prefabricated tube segments;

wherein the first annular bead section is seated in the corner of the L-shape of the first annular rim to be contained entirely below the height of the rim top of the first annular rim, contact the concave wall of the first annular rim, and contact a lowest point of the rim bead of the first annular rim, wherein the annular flexible carcass of the sleeve extends from the first annular bead section then over the curved portion of the upstanding leg before, at, and after the rim top of the first annular rim and then across the gap, then over the curved portion of the upstanding leg before, at, and after the rim top of the second annular rim, and then to the second annular bead section, wherein the second annular bead section is seated in the corner of the L-shape of the second annular rim to be contained entirely below the height of the rim top of the second annular rim, contact the concave wall of the second annular rim, and contact a lowest point of the rim bead of the second annular rim;

lowering an internal pressure in the tube to an operating pressure of an ETT-system, thereby sucking the annular flexible carcass of the sleeve inwardly between the gap between the two adjoining prefabricated tube segments and allowing the bead sections to become seated in the respective annular rims provided on the prefabricated tube segments and thereby providing an airtight seal;

wherein the rims on the outside perimeter of the open ends of the tube segments are provided by means of welding a metal annular rim to the outer perimeter, and wherein the metal rim is provided with the rim profile.

2. The method according to claim 1, wherein the flexible carcass comprises rubber.

3. The method according to claim 1, wherein the flexible carcass is reinforced with fibres or cords, selected from steel cords, polyester cords or aramid cords.

4. The method according to claim 1, wherein the bead wire is a steel wire, or cords produced from aromatic polyamide fibres selected from aramid fibres.

5. The method according to claim 1, wherein the outer surface of the expansion joint is provided with an UV-protective coating.

6. The method according to claim 1, wherein each said end of each horizontal leg of each said L shape has the rim bead hump to provide a first rim bead hump and a second rim bead hump, wherein the first annular rim is provided with the first rim bead hump and the first annular bead section is seated in the corner of the L-shape of the first annular rim to contact the first rim bead hump to prevent the first bead section of the expansion joint to move out of the first rim bead, wherein the second annular rim is provided with the second rim bead hump and the second annular bead section is seated in the corner of the L-shape of the second annular rim to contact the second rim bead hump to prevent the second bead section of the expansion joint to move out of the second rim bead, wherein the height of the rim bead hump h1 of the first annular rim is less than the height of the rim top h4 of the first annular rim, and wherein the height of the rim bead hump h1 of the second annular rim is less than the height of the rim top h4 of the second annular rim, wherein an inner annular circumference of the bead section is smaller than an outer annular circumference of the corresponding rim bead hump on the tube segment.

7. The method according to claim 1, wherein each said end of each horizontal leg of each said L shape has the rim bead hump to provide a first rim bead hump and a second rim bead hump, wherein the rim is provided with a rim profile comprising the rim top, the rim bead for receiving the bead section of the sleeve, and the rim bead hump, wherein the rim bead is between the rim top and the rim bead hump wherein rim top is proximal to the gap and each rim bead hump is distal to the gap, wherein each rim bead section is between the first end and the second end of each annular rim and contacts the rim bead hump, wherein the first rim bead hump is distal to the first rim bead section, and wherein the second rim bead hump is distal to the second rim bead section, wherein a height of the rim bead hump h1 of the first annular rim is larger than a height h3 of the lowest point of the rim bead of the first annular rim and a height of the rim bead hump h1 of the second annular rim is larger than a height h3 of the lowest point of the rim bead of the second annular rim to prevent the bead sections of the expansion joint to move out of the rim beads, wherein the height of the rim bead hump h1 of the first annular rim is less than the height of the rim top h4 of the first annular rim, and wherein the height of the rim bead hump h1 of the second annular rim is less than the height of the rim top h4 of the second annular rim.

8. The method according to claim 1, wherein the flexible carcass comprises a synthetic rubber comprising butyl rubber or a mixture of rubber composites.

9. The method according to claim 1, wherein both the flexible carcass and the bead sections comprises rubber.

10. The method according to claim 1, wherein both the flexible carcass and the bead sections comprises a synthetic rubber comprising butyl rubber or a mixture of rubber composites.

11. The method according to claim 1, wherein the two annular rims are fixed at, or close to the open ends of the prefabricated tube segments.

12. The method according claim 1, wherein the two annular rims extend into the gap beyond the open ends of the prefabricated tube segments.

13. The method according to claim 1, wherein the pressure inside the tube for the evacuated tube transport system is less than 0.1 bar.

14. The method according to claim 13 wherein, when the internal pressure in the tube segment is at the operating pressure of the ETT-system, the flexible carcass is sucked inwardly between two adjoining tube segments due to the pressure difference between outside the tube (Pout) and inside the tube (Pin), and wherein the carcass is loaded in tension as a result of said pressure difference, and wherein the bead sections become seated in the rims provided on the outside perimeter of the tube segments due to said tension.

15. The method according to claim 13, wherein the rim is a metal strip which is formed by roll-forming into a rim profile.

16. The method according to claim 13,
wherein each said end of each horizontal leg of each said L shape has the rim bead hump to provide a first rim bead hump and a second rim bead hump,
wherein the first annular rim is provided with the first rim bead hump and the first annular bead section is seated in the corner of the L-shape of the first annular rim to contact the first rim bead hump,
wherein the second annular rim is provided with the second rim bead hump and the second annular bead section is seated in the corner of the L-shape of the second annular rim to contact the second rim bead hump,
wherein an inner annular circumference of the bead section is smaller than an outer annular circumference of the corresponding rim bead hump on the tube segment,
wherein the height of the rim bead hump h1 is larger than the height h3 of the lowest point of the rim bead to prevent the bead sections of the expansion joint to move out of the rim beads if Pin equals Pout,
wherein the height of the rim bead hump h1 of the first annular rim is less than the height of the rim top h4 of the first annular rim, and
wherein the height of the rim bead hump h1 of the second annular rim is less than the height of the rim top h4 of the second annular rim.

17. The method according to claim 13, wherein one end of each tube segment is fixedly connected to a support structure, wherein the support structure comprises a pylon or a foundation, and wherein the other end of the tube segment is movably connected to a support structure to allow the tube segment to expand, contract and bend, and wherein the flexible carcass of the expansion joint between two subsequent tube segments absorbs the dimensional changes of the contracting, expanding or bending tube segment.

18. The method according to claim 13, wherein a sealant is provided between the rim profile of the tube segment and the bead section of the sleeve to further improve the airtightness, and/or wherein a bead lubricant is provided between the rim profile of the tube segment and the bead section of the sleeve to facilitate the sliding of the bead section over the rim top of the corresponding rim on the tube segment and/or to facilitate the sliding of the bead section into the rim bead.

19. A method of using an expansion joint in the production of a tube for an evacuated tube transport system (ETT) using prefabricated tube segments, comprising
providing the expansion joint and the prefabricated tube segments, and
seating opposed ends of the expansion joint on opposed open ends of the prefabricated tube segments to provide an airtight seal between the prefabricated tube segments;
wherein the expansion joint comprises two annular rims to provide opposed first and second annular rims, each said annular rim provided on an outside perimeter of a respective said prefabricated tube segment, and an annular flexible and airtight sleeve for rendering the expansion joint airtight,
wherein the sleeve comprises two annular bead section to provide first and second annular bead sections, connected by an annular flexible carcass, wherein each annular bead section comprises a bead wire, and wherein the bead sections are designed to airtightly co-operate with the two annular rims provided on the outside perimeter of the prefabricated tube segments,
wherein the prefabricated tube segments are provided on the outside perimeter with the annular rims which are each provided with a rim profile, the rim profiles airtightly co-operating with the annular bead sections of the sleeves;
wherein each annular rim is provided with the rim profile having a L-shape extending from a surface of the prefabricated tube segment and comprises a rim top on top of an upstanding leg, a rim bead for receiving the bead section of the sleeve in a corner of the L-shape, and optionally a rim bead hump at an end of a horizontal leg of the L shape,
wherein the upstanding leg of the first annular rim of the expansion joint is opposed to face the upstanding leg of the second annular rim of the expansion joint, whereby the rims of the expansion joint on the adjoining tube segments are mounted mirrored with respect to each other;
wherein each upstanding leg has an inner wall proximal to the gap and an outer wall distal to the gap and a curved portion, comprising the rim top, extending from the inner wall to the outer wall to define a U-shape, wherein the outer wall provides a convex wall and a concave wall, the curved portion extending to the convex wall, the convex wall extending to the concave wall, and the concave wall extending to the horizontal leg;

wherein the rim bead tops of the two annular rims are opposed and each have a circumference greater than an outer circumference of the prefabricated tube segment;

wherein the rim second end distal to the gap has a circumference greater than the outer circumference of the prefabricated tube segment;

wherein the first annular bead section is seated in the corner of the L-shape of the first annular rim to be contained entirely below the height of the rim top of the first annular rim, contact the concave wall of the first annular rim, and contact a lowest point of the rim bead of the first annular rim, wherein the annular flexible carcass of the sleeve extends from the first annular bead section then over the curved portion of the upstanding leg before, at, and after the rim top of the first annular rim and then across the gap, then over the curved portion of the upstanding leg before, at, and after the rim top of the second annular rim, and then to the second annular bead section, wherein the second annular bead section is seated in the corner of the L-shape of the second annular rim to be contained entirely below the height of the rim top of the second annular rim, contact the concave wall of the second annular rim, and contact a lowest point of the rim bead of the second annular rim;

wherein the rims on the outside perimeter of the open ends of the tube segments are provided by means of welding a metal annular rim to the outer perimeter, and wherein the metal rim is provided with the rim profile.

20. The method according claim 19, wherein the pressure inside the tube for the evacuated tube transport system is less than 0.1 bar.

* * * * *